US006924248B2

(12) United States Patent
Mihan et al.

(10) Patent No.: US 6,924,248 B2
(45) Date of Patent: Aug. 2, 2005

(54) CATALYST SYSTEM FOR CARRYING OUT OLEFIN POLYMERIZATION COMPRISING A CALCINED HYDRO-TALCITE SERVING AS A SUPPORTING MATERIAL

(75) Inventors: Shahram Mihan, Ludwigshafen (DE); Markus Schopf, Mannheim (DE); Joachim Wulff-Döring, Frankenthal (DE); Wolfgang Bidell, Brussels (DE); Volker Fraaije, Frankfurt (DE); Nicola Paczkowski, Loveland, OH (US); Markus Oberhoff, Speyer (DE)

(73) Assignee: Basell Polyolefine GmbH, Wesseling (DE)

( * ) Notice: Subject to any disclaimer, the term of this patent is extended or adjusted under 35 U.S.C. 154(b) by 53 days.

(21) Appl. No.: 10/297,998

(22) PCT Filed: Jun. 13, 2001

(86) PCT No.: PCT/EP01/06663

§ 371 (c)(1),
(2), (4) Date: Jun. 6, 2003

(87) PCT Pub. No.: WO01/96417

PCT Pub. Date: Dec. 20, 2001

(65) Prior Publication Data

US 2004/0033890 A1 Feb. 19, 2004

(30) Foreign Application Priority Data

Jun. 13, 2000 (DE) .......................................... 100 28 432

(51) Int. Cl.[7] .......................... B01J 31/00; B01J 37/00; C08F 4/60; C08F 4/02; C08F 4/44
(52) U.S. Cl. ...................... 502/132; 502/133; 502/110; 502/115; 526/160; 526/904; 526/943
(58) Field of Search ................................. 502/132, 133, 502/110, 115; 526/160, 904, 943

(56) References Cited

U.S. PATENT DOCUMENTS

| 3,242,150 | A | | 3/1966 | Scoggin ................ 260/88.2 |
|---|---|---|---|---|
| 3,248,179 | A | | 4/1966 | Norwood .................. 23/285 |
| 6,124,410 | A | * | 9/2000 | Ito et al. .................. 526/77 |
| 6,180,764 | B1 | | 1/2001 | Noweck et al. ............ 534/15 |
| 6,235,671 | B1 | * | 5/2001 | McKay et al. ............ 502/110 |
| 6,255,418 | B1 | | 7/2001 | Jolly et al. ................ 526/160 |
| 6,355,744 | B1 | * | 3/2002 | von Haken Spence et al. .. 526/127 |
| 6,417,302 | B1 | | 7/2002 | Bohnen .................... 526/160 |

FOREIGN PATENT DOCUMENTS

| CA | 2053900 | 10/1990 |
|---|---|---|
| CA | 2237231 | 11/1999 |
| DE | 2163851 | 6/1973 |
| DE | 19710615 | 9/1998 |
| EP | 982328 | 3/2000 |
| GB | 1380949 | 1/1975 |

(Continued)

OTHER PUBLICATIONS

Chem. Rev., vol. 100, 2000, no. 4, pp. 1169–1681.
Small et al., J. Am. Chem. Soc., 1998, vol. 120, 4049–4050.
Britovsek et al., Chem. Comm., 1998, 849–850.
Enders et al., Chem. Ber., vol. 129, Nov. 13, 1995, 459–463.
Jutzi et al., J. Org. Chem., 500, 1995, 175–185.
Wiesenfeldt et al., J. Org. Chem., 369 (1989) 359–370.

Primary Examiner—J. A. Lorengo
Assistant Examiner—J. Pasterczyk
(74) Attorney, Agent, or Firm—Novak Druce & Quigg

(57) ABSTRACT

Catalyst system for olefin polymerization comprising
A) at least one calcined hydrotalcite,
B) at least one organic transition metal compound,
C) optionally one or more cation-forming compounds and
D) at least one organic magnesium compound.

8 Claims, 4 Drawing Sheets

FOREIGN PATENT DOCUMENTS

| | | |
|---|---|---|
| WO | 90/13533 | 11/1990 |
| WO | 91/09882 | 7/1991 |
| WO | 96/00243 | 1/1996 |
| WO | 96/23727 | 8/1996 |
| WO | 97/17136 | 5/1997 |
| WO | 98/22486 | 5/1998 |
| WO | 98/40419 | 9/1998 |
| WO | 99/06414 | 2/1999 |
| WO | 00/05277 | 2/2000 |
| WO | 00/31090 | 6/2000 |
| WO | 01/09148 | 2/2001 |

\* cited by examiner

CATALYST SYSTEM FOR CARRYING OUT OLEFIN POLYMERIZATION COMPRISING A CALCINED HYDRO-TALCITE SERVING AS A SUPPORTING MATERIAL

The present invention relates to a catalyst system comprising
A) at least one calcined hydrotalcite,
B) at least one organic transition metal compound,
C) optionally one or more cation-forming compounds and
D) at least one organic magnesium compound.

Furthermore, the invention relates to the use of the catalyst system for the polymerization or copolymerization of olefins and to a process for preparing polyolefins by polymerization or copolymerization of olefins in the presence of the catalyst system.

Organic transition metal compounds such as metallocene complexes are of great interest as catalysts for olefin polymerization because they make it possible to synthesize polyolefins which cannot be obtained using conventional Ziegler-Natta catalysts. For example, such single-site catalysts lead to polymers having a narrow molar mass distribution and uniform incorporation of comonomers. For these to be able to be used successfully in polymerization processes in the gas phase or in suspension, it is often advantageous to use the metallocenes in the form of a solid, i.e. for them to be applied to a solid support. Furthermore, the supported catalysts have a high productivity.

As solid support materials for catalysts for olefin polymerization, use is frequently made of silica gels, since particles having a size and structure which makes them suitable as supports for olefin polymerization can be produced from this material. Spray-dried silica gels which consist of spherical agglomerates of smaller granular particles, known as the primary particles, have been found to be particularly useful for this purpose.

However, the use of silica gels as support material has been found to be disadvantageous in some applications. In the production of film products, specks caused by silica gel particles remaining in the polymer can be formed. The production of fiber products is also problematical. Here, a melt filtration is usually carried out prior to spinning. If the amounts of particulate catalyst residues in the polymers are too high, pressure can build up on the sieve plate. This leads to considerable process engineering difficulties such as shortened filter operating times. Particulate catalyst residues can be determined analytically by examining melt preparations of the smallest sieve fraction of a sieved polymer, which is conspicuously enriched in the contaminant, under an optical microscope.

Hydrotalcites are inorganic materials from which it is likewise possible to produce particles in sizes and with morphologies which make them appear suitable as supports for the preparation of catalysts for olefin polymerization. Subsequent calcination enables, inter alia, the desired content of hydroxyl groups to be set. Furthermore, it also changes the crystal structure.

CA-A 2 237 231 describes a heterogeneous olefin polymerization catalyst composition comprising an organometallic complex of a metal of groups 3 to 10 of the Periodic Table of the Elements with at least one ligand of the cyclopentadienyl type, an activator and a hydrotalcite, with the catalyst composition being prepared by spray drying a mixture of the components.

WO 90/13533 discloses that calcined hydrotalcites act as catalysts for the ethoxylation or propoxylation of fatty acid esters. Furthermore, DE-A 21 63 851 discloses that calcined hydrotalcites which have been halogenated after calcination are suitable as support materials for Ziegler-Natta catalysts for olefin polymerization.

It is an object of the present invention to provide a catalyst system which results in a very small amount of interfering particulate catalyst residues, if any, remaining in the polymer, which gives a high catalyst activity in polymerization processes and which allows a simple work-up of the polymers after the polymerization.

We have found that this object is achieved by a catalyst system for olefin polymerization comprising
A) at least one calcined hydrotalcite,
B) at least one organic transition metal compound,
C) optionally one or more cation-forming compounds and
D) at least one organic magnesium compound.

We have also found the use of the catalyst system for the polymerization or copolymerization of olefins and a process for preparing polyolefins by polymerization or copolymerization of olefins in the presence of the catalyst solid.

The catalyst systems of the present invention are suitable for the polymerization of olefins and especially for the polymerization of α-olefins, i.e. hydrocarbons having terminal double bonds. Suitable monomers also include functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$–$C_{12}$-1-alkenes, in particular linear $C_2$–$C_{10}$-1-alkenes such as ethylene, propylene, 1-butene, 1-pentene, 1-hexene, 1-heptene, 1-octene, 1-decene or branched $C_2$–$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins.

Suitable olefins also include ones in which the double bond is part of a cyclic structure which can have one or more ring systems. Examples are cyclopentene, norbornene, tetracyclododecene and methylnorbornene and dienes such as 5-ethylidene-2-norbornene, norbornadiene or ethylnorbornadiene.

Mixtures of two or more olefins can also be polymerized. In particular, the catalyst systems of the present invention can be used for the polymerization or copolymerization of ethylene or propylene. As comonomers in the polymerization of ethylene, preference is given to using $C_3$–$C_8$-α-olefins, in particular 1-butene, 1-pentene, 1-hexene and/or 1-octene. In the polymerization of propylene, preferred comonomers are ethylene and/or butene.

The catalyst systems of the present invention comprise at least one calcined hydrotalcite.

In mineralogy, hydrotalcite is a natural mineral having the ideal formula

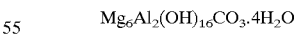

$$Mg_6Al_2(OH)_{16}CO_3.4H_2O$$

whose structure is derived from that of brucite $Mg(OH)_2$. Brucite crystallizes in a sheet structure with the metal ions in octahedral holes between two layers of close-packed hydroxyl ions, with only every second layer of the octahedral holes being occupied. In hydrotalcite, some magnesium ions are replaced by aluminum ions, as a result of which the packet of layers gains a positive charge. This is compensated by the anions which are located together with water of crystallization in the layers in between.

Such sheet structures are found not only in magnesium-aluminum hydroxides, but also generally in mixed metal hydroxides of the formula

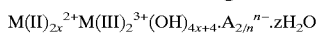

which have a sheet structure and in which M(II) is a divalent metal such as Mg, Zn, Cu, Ni, Co, Mn, Ca and/or Fe and M(III) is a trivalent metal such as Al, Fe, Co, Mn, La, Ce and/or Cr, x is from 0.5 to 10 in steps of 0.5, A is an interstitial anion and n is the charge on the interstitial anion which can be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogencarbonate, nitrate, chloride, sulfate or $B(OH)_4^-$ or polyoxo metal anions such as $Mo_7O_{24}^{6-}$ or $V_{10}O_{28}^{6-}$. However, a mixture of a plurality of such anions can also be present.

Accordingly, all such mixed metal hydroxides having a sheet structure should be regarded as hydrotalcites for the purposes of the present invention.

Suitable hydrotalcites are generally prepared synthetically. One possible way is to bring salts of the metals into solution and to combine these with one another under defined conditions. The process described in WO 96/23727, which comprises mixing alkoxides of the divalent and trivalent metals and hydrolyzing the mixtures with water, is preferred according to the present invention.

Calcined hydrotalcites can be prepared from hydrotalcites by calcination, i.e. heating. The preparation of the calcined hydrotalcites used according to the present invention is usually carried out at temperatures above 180° C. Preference is given to calcination for from 3 to 24 hours at from 250° C. to 1000° C., in particular from 400° C. to 700° C. It is possible for air or inert gas to be passed over the solid during calcination or for a vacuum to be applied.

On heating, the natural or synthetic hydrotalcites firstly give off water, i.e. drying occurs. On further heating, the actual calcination, the metal hydroxides are converted into the metal oxides by elimination of hydroxyl groups and interstitial anions; OH groups or interstitial anions such as carbonate can also still be present in the calcined hydrotalcites. A measure of this is the loss on ignition. This is the weight loss experienced by a sample which is heated in two steps firstly for 30 minutes at 200° C. in a drying oven and then for 1 hour at 950° C. in a muffle furnace.

The calcined hydrotalcites used as component A) are thus mixed oxides of the divalent and trivalent metals M(II) and M(III), with the molar ratio of M(II) to M(III) generally being in the range from 0.5 to 10, preferably from 0.75 to 8 and in particular from 1 to 4. Furthermore, normal amounts of impurities, for example Si, Fe, Na, Ca or Ti, can also be present.

Preferred calcined hydrotalcites A) are mixed oxides in which M(II) is magnesium and M(III) is aluminum. Such aluminum-magnesium mixed oxides are obtainable from Condea Chemie GmbH, Hamburg, under the trade name Puralox Mg.

In the calcined hydrotalcites used according to the present invention, the elimination of hydroxyl groups and interstitial anions or the conversion into the metal oxides does not have to be complete, i.e. partially calcined hydrotalcites can also be used for preparing the catalyst solids of the present invention. Preference is also given to calcined hydrotalcites in which the structural transformation is complete or virtually complete. Calcination, i.e. transformation of the structure, can be confirmed, for example, by means of X-ray diffraction patterns.

Aluminum-magnesium mixed oxides were examined on a D 5000 powder diffractometer from Siemens, after different calcination times (using Cu $K_\alpha$ radiation). FIG. 1 shows an X-ray diffraction pattern of a calcined aluminum-magnesium mixed oxide. This pattern is characterized by peaks on the 2-theta scale at 35–37°, 43–45° and 62–64°. FIG. 4 shows the X-ray diffraction pattern of the starting material which displays, in particular, peaks at 11–14° and 22–25°. FIG. 2 shows an X-ray diffraction pattern of a partially calcined support material according to the present invention. This was likewise obtained from the starting material shown in FIG. 4. Both the peaks of the starting material and those of a calcined aluminum-magnesium mixed oxide can be seen. Nevertheless, the X-ray diffraction pattern differs significantly from that of the uncalcined starting material.

The calcined hydrotalcites used according to the present invention are generally employed as finely divided powders having a mean particle diameter $d_{50}$ of from 5 to 200 μm, preferably from 10 to 150 μm, particularly preferably from 15 to 100 μm and in particular from 20 to 70 μm.

The particulate calcined hydrotalcites usually have pore volumes of from 0.1 to 10 cm³/g, preferably from 0.2 to 4 cm³/g, and specific surface areas of from 30 to 1000 m²/g, preferably from 50 to 500 m²/g and in particular from 100 to 300 m²/g.

The support material used according to the present invention can, in addition, also be treated chemically using customary desiccants such as metal alkyls. Appropriate treatment methods are described, for example, in WO 00/31090. Chlorinating the support material, for example using phosgene, should be avoided.

As organic transition metal compound B), it is in principle possible to use all compounds of the transition metals of groups 3 to 12 of the Periodic Table or the lanthanides which contain organic groups and preferably form active catalysts for olefin polymerization after reaction with the components C), in the presence of D) and optionally E). These are usually compounds in which at least one monodentate or polydentate ligand is bound to the central atom via a sigma or pi bond. Possible ligands include both ligands containing cyclopentadienyl radicals and ones which are free of cyclopentadienyl radicals. A large number of such compounds B) suitable for olefin polymerization are described in Chem. Rev. 2000, Vol. 100, No. 4. Furthermore, multinuclear cyclopentadienyl complexes are also suitable for olefin polymerization.

Suitable compounds B) are, for example, transition metal complexes with at least one ligand of the formulae F-I to F-V,

F-I

-continued

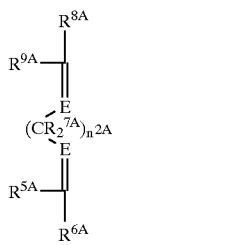
F-II

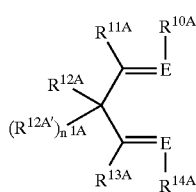
F-III

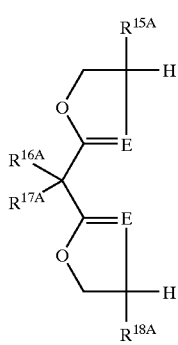
F-IV

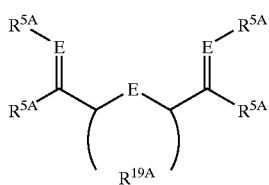
F-V where the transition metal is selected from among the elements Ti, Zr, Hf, Sc, V, Nb, Ta, Cr, Mo, W, Fe, Co, Ni, Pd, Pt and the elements of the rare earth metals. Preference is given to using compounds having nickel, iron, cobalt and palladium as central metal.

E is an element of group 15 of the Periodic Table of the Elements, preferably N or P, with particular preference being given to N. The two or three atoms E in a molecule can be identical or different.

The radicals $R^{1A}$ to $R^{19A}$, which may be identical or different within a ligand system F-I to F-V, are as follows:
$R^{1A}$ and $R^{4A}$ are each, independently of one another, a hydrocarbon radical or a substituted hydrocarbon radical, preferably a hydrocarbon radical in which the carbon atom adjacent to the element E is bound to at least two carbon atoms,
$R^{2A}$ and $R^{3A}$ are each, independently of one another, hydrogen, a hydrocarbon radical or a substituted hydrocarbon radical, where $R^{2A}$ and $R^{3A}$ may also together form a ring system in which one or more heteroatoms may be present,
$R^{6A}$ and $R^{8A}$ are each, independently of one another, a hydrocarbon radical or a substituted hydrocarbon radical,
$R^{5A}$ and $R^{9A}$ are each, independently of one another, hydrogen, a hydrocarbon radical or a substituted hydrocarbon radical,
where $R^{6A}$ and $R^{5A}$ or $R^{8A}$ and $R^{9A}$ may also together form a ring system,
$R^{7A}$ are each, independently of one another, hydrogen, a hydrocarbon radical or a substituted hydrocarbon radical, where two $R^{7A}$ may also together form a ring system,
$R^{10A}$ and $R^{14A}$ are each, independently of one another, a hydrocarbon radical or a substituted hydrocarbon radical,
$R^{11A}$, $R^{12A}$, $R^{12A'}$ and $R^{13A}$ are each, independently of one another, hydrogen, a hydrocarbon radical or a substituted hydrocarbon radical, where two or more geminal or vicinal radicals $R^{11A}$, $R^{12A}$, $R^{12A'}$ and $R^{13A}$ may also together form a ring system,
$R^{15A}$ and $R^{18A}$ are each, independently of one another, hydrogen, a hydrocarbon radical or a substituted hydrocarbon radical,
$R^{16A}$ and $R^{17A}$ are each, independently of one another, hydrogen, a hydrocarbon radical or a substituted hydrocarbon radical,
$R^{19A}$ is an organic radical which forms a 5- to 7-membered substituted or unsubstituted, in particular unsaturated or aromatic, heterocyclic ring system, in particular together with E forms a pyridine system,
$n^{1A}$ is 0 or 1, with F-III being negatively charged when $n^{1A}$ is 0, and
$n^{2A}$ is an integer from 1 to 4, preferably 2 or 3.

Particularly useful transition metal complexes containing ligands of the formulae F-I to F-IV are, for example, complexes of the transition metals Fe, Co, Ni, Pd or Pt with ligands of the formula F-I. Particular preference is given to diimine complexes of Ni or Pd, e.g.:
di(2,6-di-i-propylphenyl)-2,3-dimethyldiazabutadienepalladium dichloride,
di(di-i-propylphenyl)-2,3-dimethyldiazabutadienenickel dichloride,
di(2,6-di-i-propylphenyl)dimethyldiazabutadienedimethylpalladium,
di(2,6-di-i-propylphenyl)-2,3-dimethyldiazabutadienedimethylnickel,
di(2,6-dimethylphenyl)-2,3-dimethyldiazabutadienepalladium dichloride,
di(2,6-dimethylphenyl)-2,3-dimethyldiazabutadienenickel dichloride,
di(2,6-dimethylphenyl)-2,3-dimethyldiazabutadienedimethylpalladium,
di(2,6-dimethylphenyl)-2,3-dimethyldiazabutadienedimethylnickel,
di(2-methylphenyl)-2,3-dimethyldiazabutadienepalladium dichloride,
di(2-methylphenyl)-2,3-dimethyldiazabutadienenickel dichloride,
di(2-methylphenyl)-2,3-dimethyldiazabutadienedimethylpalladium,
di(2-methylphenyl)-2,3-dimethyldiazabutadienedimethylnickel,
diphenyl-2,3-dimethyldiazabutadienepalladium dichloride,
diphenyl-2,3-dimethyldiazabutadienenickel dichloride,
diphenyl-2,3-dimethyldiazabutadienedimethylpalladium,
diphenyl-2,3-dimethyldiazabutadienedimethylnickel,
di(2,6-dimethylphenyl)azanaphthenepalladium dichloride,
di(2,6-dimethylphenyl)azanaphthenenickel dichloride,
di(2,6-dimethylphenyl)azanaphthenedimethylpalladium,
di(2,6-dimethylphenyl)azanaphthenedimethylnickel,
1,1'-bipyridylpalladium dichloride,
1,1'-bipyridylnickel dichloride,
1,1'-bipyridyl(dimethyl)palladium,
1,1'-bipyridyl(dimethyl)nickel.

Particularly useful compounds F-V also include those which are described in J. Am. Chem. Soc. 120, p. 4049 ff. (1998), J. Chem. Soc., Commun. 1998, 849. Preferred complexes containing the ligands F-V are 2,6-bis(imino)pyridyl complexes of the transition metals Fe, Co, Ni, Pd and Pt, in particular Fe.

Iminophenoxide complexes can also be used as organic transition metal compounds B). The ligands of these complexes can be prepared, for example, from substituted or unsubstituted salicylaldehydes and primary amines, in particular substituted or unsubstituted arylamines. Transition metal complexes with pi ligands having one or more heteroatoms in the pi system, for example the boratabenzene ligand, the pyrrolyl anion or the phospholyl anion, can also be used as organic transition metal compounds B).

Particularly useful organic transition metal compounds B) include those having at least one cyclopentadienyl-type ligand, which are generally referred to as metallocene complexes. Particularly useful metallocene complexes are those of the formula (I)

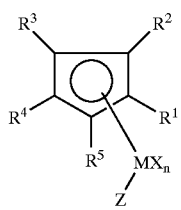

(I)

where the substituents and indices have the following meanings:

M is titanium, zirconium, hafnium, vanadium, niobium, tantalum, chromium, molybdenum or tungsten or an element of group 3 of the Periodic Table and the lanthanides, X is fluorine, chlorine, bromine, iodine, hydrogen, $C_1$–$C_{10}$-alkyl, $C_2$–$C_{10}$-alkenyl, $C_6$–$C_{15}$-aryl, alkylaryl having from 1 to 10 carbon atoms in the alkyl part and from 6 to 20 carbon atoms in the aryl part, —$OR^6$ or —$NR^6R^7$, or two radicals X may form a substituted or unsubstituted diene ligand, in particular a 1,3-diene ligand, and n is 1, 2 or 3 and has a value such that, depending on the valence of M, the metallocene complex of the formula (I) is uncharged, where $R^6$ and $R^7$ are each $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical and the radicals X are identical or different and may be joined to one another, $R^1$ to $R^5$ are each hydrogen, $C_1$–$C_{22}$-alkyl, 5- to 7-membered cycloalkyl or cycloalkenyl which may in turn bear $C_1$–$C_{10}$-alkyl groups as substituents, $C_2$–$C_{22}$-alkenyl, $C_6$–$C_{22}$-aryl, alkylaryl or arylalkyl, where two adjacent radicals may also together form a saturated or unsaturated cyclic group having from 4 to 44 carbon atoms, or $Si(R^8)_3$ where $R^8$ are identical or different and are each $C_1$–$C_{10}$-alkyl, $C_3$–$C_{10}$-cycloalkyl, $C_6$–$C_{15}$-aryl, $C_1$–$C_4$-alkoxy or $C_6$–$C_{10}$-aryloxy, and Z is as defined for X or is

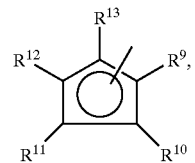

where the radicals $R^9$ to $R^{13}$ are each hydrogen, $C_1$–$C_{22}$-alkyl, 5- to 7-membered cycloalkyl or cycloalkenyl which may in turn bear $C_1$–$C_{10}$-alkyl groups as substituents, $C_2$–$C_{22}$-alkenyl, $C_6$–$C_{22}$-aryl, alkylaryl or arylalkyl, where two adjacent radicals may also together form a saturated or unsaturated cyclic group having from 4 to 44 carbon atoms, or $Si(R^{14})_3$ where $R^{14}$ are identical or different and are each $C_1$–$C_{10}$-alkyl, $C_3$–$C_{10}$-cycloalkyl, $C_6$–$C_{15}$-aryl, $C_1$–$C_4$-alkoxy or $C_6$–$C_{10}$-aryloxy, or the radicals $R^4$ and Z together form a —$R^{15}$-A-group, where $R^{15}$ is

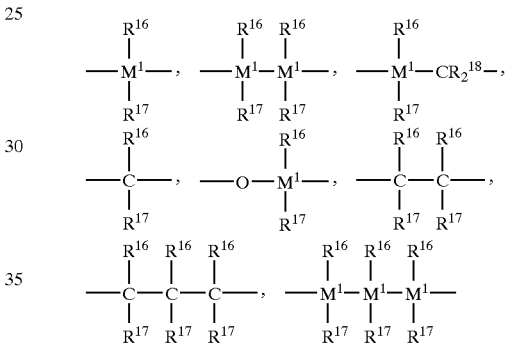

=$BR^{16}$, =$BNR^{16}R^{17}$, =$AlR^{16}$, —Ge—, —Sn—, —O—, —S—, =SO, =$SO_2$, =$NR^{16}$, =CO, =$PR^{16}$ or =$P(O)R^{16}$, where $R^{16}$, $R^{17}$ and $R^{18}$ are identical or different and are each a hydrogen atom, a halogen atom, a trimethylsilyl group, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_7$–$C_{15}$-alkylaryloxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a saturated or unsaturated ring having from 4 to 15 carbon atoms, and $M^1$ is silicon, germanium or tin, A is —O—, —S—,

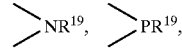

—O—$R^{19}$, —$NR^{19}_2$ or —$PR^{19}_2$, where $R^{19}$ are each, independently of one another, $C_1$–$C_{10}$-alkyl, $C_6$–$C_{15}$-aryl, $C_3$–$C_{10}$-cycloalkyl, $C_7$–$C_{18}$-alkylaryl or $Si(R^{20})_3$, $R^{20}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl, or the radicals $R^4$ and $R^{12}$ together form a —$R^{15}$-group.

The radicals X in the formula (I) are preferably identical and are preferably each fluorine, chlorine, bromine, $C_1$–$C_7$-alkyl or aralkyl, in particular chlorine, methyl or benzyl.

Among the metallocene complexes of the formula (I), preference is given to

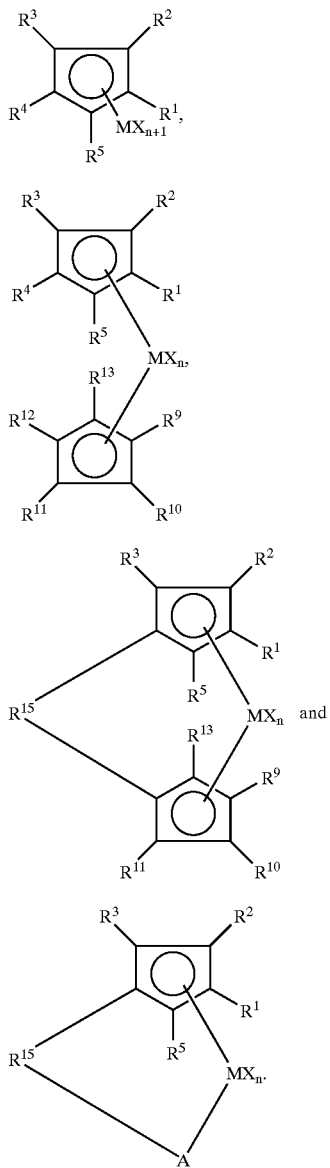

Among the compounds of the formula (Ia), particular preference is given to those in which
M is titanium, zirconium or hafnium,
X is chlorine, $C_1$–$C_4$-alkyl, phenyl, alkoxy or aryloxy,
n is 1 or 2 and
$R^1$ to $R^5$ are each hydrogen or $C_1$–$C_4$-alkyl.

Among the compounds of the formula (Ib), preference is given to those in which
M is titanium, zirconium or hafnium,
X is chlorine, $C_1$–$C_4$-alkyl or benzyl, or two radicals X form a substituted or unsubstituted butadiene ligand,
n is 2,
$R^1$ to $R^5$ are each hydrogen, $C_1$–$C_4$-alkyl or $Si(R^8)_3$ and $R^9$ to $R^{13}$ are each hydrogen, $C_1$–$C_4$-alkyl or $Si(R^{14})_3$, or two radicals $R^1$ to $R^5$ and/or $R^9$ to $R^{13}$ together with the $C_5$ ring form an indenyl or substituted indenyl system.

Particular preference is given to compounds of the formula (Ib) in which the cyclopentadienyl radicals are identical.

Examples of particularly useful compounds include:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride,
bis(1-n-butyl-3-methylcyclopentadienyl)zirconium dichloride,
bis(indenyl)zirconium dichloride,
bis(tetrahydroindenyl)zirconium dichloride and
bis(trimethylsilylcyclopentadienyl)zirconium dichloride
and also the corresponding dimethylzirconium compounds.

Particularly useful compounds of the formula (Ic) are ones in which
$R^1$ and $R^9$ are identical or different and are each hydrogen or a $C_1$–$C_{10}$-alkyl group,
$R^5$ and $R^{13}$ are identical or different and are each hydrogen or a methyl, ethyl, isopropyl or tert-butyl group,
$R^3$ and $R^{11}$ are each $C_1$–$C_4$-alkyl and
$R^2$ and $R^{10}$ are each hydrogen
or
two adjacent radicals $R^2$ and $R^3$ or $R^{10}$ and $R^{11}$ together form a saturated or unsaturated cyclic group having from 4 to 44 carbon atoms,
$R^{15}$ is

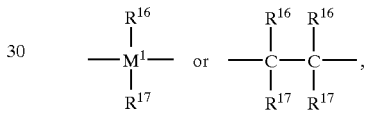

or $=BR^{16}$ or $=BNR^{16}R^{17}$,
M is titanium, zirconium or hafnium and
X are identical or different and are each chlorine, $C_1$–$C_4$-alkyl, benzyl, phenyl or $C_7$–$C_{15}$-alkylaryloxy.

Especially useful compounds of the formula (Ic) are those of the formula (Ic')

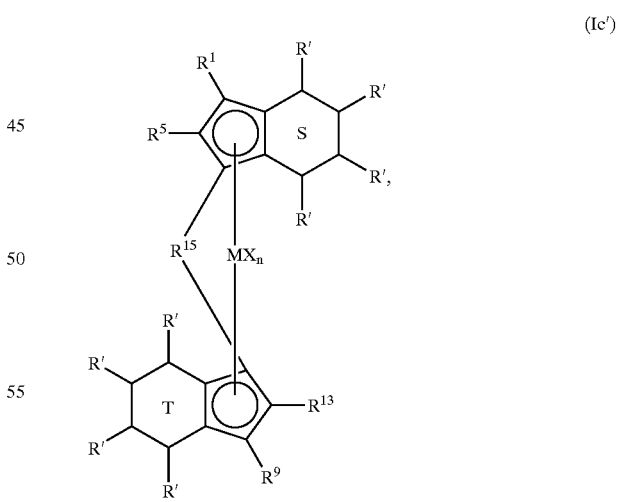

where
the radicals R' are identical or different and are each hydrogen, $C_1$–$C_{10}$-alkyl or $C_3$–$C_{10}$-cycloalkyl, preferably methyl, ethyl, isopropyl or cyclohexyl, $C_6$–$C_{20}$-aryl, preferably phenyl, naphthyl or mesityl, $C_7$–$C_{40}$-arylalkyl, $C_7$–$C_{40}$-alkylaryl, preferably 4-tert-butylphenyl or 3,5-di-tert-butylphenyl, or $C_8$–$C_{40}$-arylalkenyl, $R^5$ and $R^{13}$ are identical or different and are each hydrogen or $C_1$–$C_6$-alkyl, preferably methyl, ethyl, isopropyl, n-propyl, n-butyl, n-hexyl or tert-butyl, and the rings S and T are identical or different, saturated, unsaturated or partially saturated.

The indenyl or tetrahydroindenyl ligands of the metallocenes of the formula (Ic') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular in the 2,4 positions, where the following nomenclature is employed for the site of substitution:

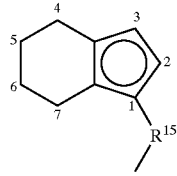

As complexes (Ic'), preference is given to using bridged bisindenyl complexes in the Rac or pseudo-Rac form, where the term pseudo-Rac refers to complexes in which the two indenyl ligands are in the Rac arrangement relative to one another when all other substituents of the complex are disregarded.

Examples of particularly useful complexes (Ic) and (Ic') include:

dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methyl-4,5-benzindenyl)zirconium dichloride,
dimethylsilanediylbis(2-ethyl-4,5-benzindenyl)zirconium dichloride,
methylphenylsilanediylbis(2-methyl-4,5-benzindenyl)zirconium dichloride,
methylphenylsilanediylbis(2-ethyl-4,5-benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4-(1-naphthyl)indenyl)zirconium dichloride,
dimethylsilanediylbis(2-ethyl-4-(1-naphthyl)indenyl)zirconium dichloride,
dimethylsilanediylbis(2-propyl-4-(1-naphthyl)indenyl)zirconium dichloride,
dimethylsilanediylbis(2-i-butyl-4-(1-naphthyl)indenyl)zirconium dichloride,
dimethylsilanediylbis(2-propyl-4-(9-phenanthryl)indenyl)zirconium dichloride,
dimethylsilanediylbis(2-methyl-4-isopropylindenyl)zirconium dichloride,
dimethylsilanediylbis(2,7-dimethyl-4-isopropylindenyl)zirconium dichloride,
dimethylsilanediylbis(2-methyl-4,6-diisopropylindenyl)zirconium dichloride,
dimethylsilanediylbis(2-methyl-4-[p-trifluoromethylphenyl]indenyl)zirconium dichloride,
dimethylsilanediylbis(2-methyl-4-[3',5'-dimethylphenyl]indenyl)zirconium dichloride,
dimethylsilanediylbis(2-methyl-4-[4'-tert-butylphenyl]indenyl)zirconium dichloride,
dimethylsilanediylbis(2-methyl-4-[4'-tert-butylphenyl]indenyl)zirconium dichloride,
dimethylsilanediylbis(2-methyl-4-[4'-tert-butylphenyl]indenyl)zirconium dichloride,
dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride,
dimethylsilanediylbis(2-hexyl-4-[4'-tert-butylphenyl]indenyl)zirconium dichloride,
dimethylsilanediyl(2-isopropyl-4-phenylindenyl)(2-methyl-4-phenylindenyl)zirconium dichloride,
dimethylsilanediyl(2-isopropyl-4-(1-naphthyl)indenyl)(2-methyl-4-(1-naphthyl)indenyl)zirconium dichloride,
dimethylsilanediyl(2-isopropyl-4-[4'-tert-butylphenyl]indenyl)(2-methyl-4-[4-tert-butylphenyl]-indenyl)zirconium dichloride,
dimethylsilanediyl(2-isopropyl-4-[4'-tert-butylphenyl]indenyl)(2-ethyl-4-[4'-tert-butylphenyl]indenyl)zirconium dichloride,
dimethylsilanediyl(2-isopropyl-4-[4'-tert-butylphenyl]indenyl)(2-methyl-4-[3',5'-bis-ter-butyl-phenyl]indenyl)zirconium dichloride,
dimethylsilanediyl(2-isopropyl-4-[4'-tert-butylphenyl]indenyl)(2-methyl-4-[1'-naphthyl]indenyl)-zirconium dichloride and ethylene(2-isopropyl-4-[4'-tert-butylphenyl]indenyl)(2-methyl-4-[4'-tert-butylphenyl]indenyl)-zirconium dichloride and also the corresponding dimethylzirconium, monochloromono(alkyl-aryloxy)zirconium and di(alkylaryloxy)zirconium compounds.

Particularly useful compounds of the formula (Id) are those in which

M is titanium or zirconium, in particular titanium,
X is chlorine, $C_1$–$C_4$-alkyl or phenyl or two radicals X form a substituted or unsubstituted butadiene ligand, $R^{15}$ is

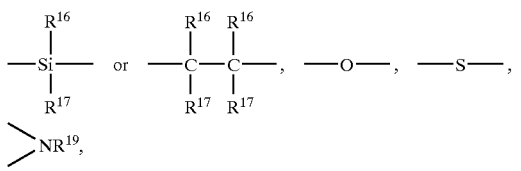

A is —O—, —S—,
and
$R^1$ to $R^3$ and $R^5$ are each hydrogen, $C_1$–$C_{10}$-alkyl, preferably methyl, $C_3$–$C_{10}$-cycloalkyl, $C_6$–$C_{15}$-aryl or $Si(R^8)_3$, or two adjacent radicals form a cyclic group having from 4 to 12 carbon atoms, with particular preference given to all $R^1$ to $R^3$ and $R^5$ being methyl.

Another group of particularly useful compounds of the formula (Id) are those in which
M is titanium or chromium in the oxidation state III,
X is chlorine, $C_1$–$C_4$-alkyl or phenyl or two radicals X form a substituted or unsubstituted butadiene ligand,
$R^{15}$ is

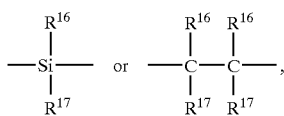

A is —O—$R^{19}$, —$NR^{19}_2$, —$PR^{19}_2$ and
$R^1$ to $R^3$ and $R^5$ are each hydrogen, $C_1$–$C_{10}$-alkyl, $C_3$–$C_{10}$-cycloalkyl, $C_6$–$C_{15}$-aryl or $Si(R^8)_3$, or two adjacent radicals form a cyclic group having from 4 to 12 carbon atoms.

The synthesis of such complexes can be carried out by methods known per se, preferably by reacting the appropriately substituted, cyclic hydrocarbon anions with halides of titanium, zirconium, hafnium, vanadium, niobium, tantalum or chromium.

Examples of appropriate methods of preparation are described, inter alia, in Journal of Organo-metallic Chemistry, 369 (1989), 359–370.

Further suitable organic transition metal compounds B) are metallocenes having at least one ligand formed from a cyclopentadienyl or heterocyclopentadienyl and a fused-on heterocycle, where the heterocycles are preferably aromatic and contain nitrogen and/or sulfur. Such compounds are described, for example, in WO 98/22486. These are, in particular:
dimethylsilanediyl(2-methyl-4-phenylindenyl)(2,5-dimethyl-N-phenyl-4-azapentalene)zirconium dichloride,
dimethylsilanediylbis(2-methyl-4-phenyl-4-hydroazulenyl) zirconium dichloride,
dimethylsilanediylbis(2-ethyl-4-phenyl-4-hydroazulenyl) zirconium dichloride.

Organic transition metal compounds B) which are suitable for the purposes of the present invention also include substituted monocyclopentadienyl, monoindenyl, monofluorenyl or heterocyclopentadienyl complexes of chromium, molybdenum or tungsten, where at least one of the substituents on the cyclopentadienyl ring bears a rigid donor function which is not bound exclusively via $sp^3$-hybridized carbon or silicon atoms.

The most direct link to the donor function contains at least one sp- or $sp^2$-hybridized carbon atom, preferably from 1 to 3 $sp^2$-hybridized carbon atoms. The direct link preferably contains an unsaturated double bond, an aromatic or together with the donor forms a partially unsaturated or aromatic heterocyclic system.

In these organic transition metal compounds B), the cyclopentadienyl ring can also be a heterocyclopentadienyl ligand, i.e. at least one carbon atom can be replaced by a heteroatom from group 15 or 16. In this case, a $C_5$-ring carbon atom is preferably replaced by phosphorus. In particular, the cyclopentadienyl ring is substituted by further alkyl groups which can also form a 5- or 6-membered ring such as tetrahydroindenyl, indenyl, benzindenyl or fluorenyl.

Possible donors are uncharged functional groups which contain an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide or unsubstituted, substituted or fused, partially unsaturated heterocyclic or heteroaromatic ring systems.

Preference is given to using substituted monocyclopentadienyl, monoindenyl, monofluorenyl or heterocyclopentadienyl complexes of the formula (II)

$$[Z^{1B}-M^{1B}-X_{n^{1B}}^{1B}]_{m^{1B}} \quad (II),$$

where the variables have the following meanings:
$M^{1B}$ is chromium, molybdenum or tungsten,
$Z^{1B}$ has the formula (IIa)

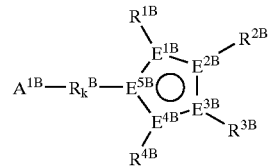

(IIa)

where the variables have the following meanings:
$E^{1B}$–$E^{5B}$ are each carbon or at most one of $E^{1B}$ to $E^{5B}$ is phosphorus or nitrogen,
$A^{1B}$ is $NR^{5B}R^{6B}$, $PR^{5B}R^{6B}$, $OR^{5B}$, $SR^{5B}$ or an unsubstituted, substituted or fused, partially unsaturated heterocyclic or heteroaromatic ring system,
$R^B$ is one of the following groups:

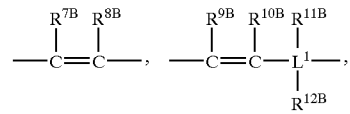

and, in addition, if $A^{1B}$ is an unsubstituted, substituted or fused, partially unsaturated heterocyclic or heteroaromatic ring system, may also be

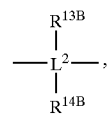

where
$L^1$, $L^2$ are each silicon or carbon,
k is 1 or, when $A^{1B}$ is an unsubstituted, substituted or fused, partially unsaturated heterocyclic or heteroaromatic ring system, may also be 0,
$X^{1B}$ are each, independently of one another, fluorine, chlorine, bromine, iodine, hydrogen, $C_1$–$C_{10}$-alkyl, $C_2$–$C_{10}$-alkenyl, $C_6$–$C_{20}$-aryl, alkylaryl having 1–10 carbon atoms in the alkyl part and 6–20 carbon atoms in the aryl part, $NR^{15B}R^{16B}$, $OR^{15B}$, $SR^{15B}$, $SO_3R^{15B}$, $OC(O)R^{15B}$, CN, SCN, β-diketonate, CO, $BF_4^-$, $PF_6^-$ or a bulky noncoordinating anion, $R^{1B}$–$R^{16B}$ are each, independently of one another, hydrogen, $C_1$–$C_{20}$-alkyl, $C_2$–$C_{20}$-alkenyl, $C_6$–$C_{20}$-aryl, alkylaryl having from 1 to 10 carbon atoms in the alkyl part and 6–20 carbon atoms in the aryl part, $SiR^{17B}{}_3$, where the organic radicals $R^{1B}$–$R^{16B}$ may also be substituted by halogens and two geminal or vicinal radicals $R^{1B}$–$R^{16B}$ may also be joined to form a five- or six-membered ring, $R^{17B}$ are each, independently of one another, hydrogen, $C_1$–$C_{20}$-alkyl, $C_2$–$C_{20}$-alkenyl, $C_6$–$C_{20}$-aryl, alkylaryl having from 1 to 10 carbon atoms in the alkyl part and 6–20 carbon atoms in the aryl part and two geminal radicals $R^{17B}$ may also be joined to form a five- or six-membered ring, $n^{1B}$ is 1, 2 or 3 and $m^{1B}$ is 1, 2 or 3.

As transition metal $M^{1B}$, particular preference is given to chromium.

$Z^{1B}$ is a substituted cyclopentadienyl system, and the radical —$R^B{}_k$-$A^{1B}$ bears a rigid bound donor function. The cyclopentadienyl ring is bound to the transition metal via a $\eta^5$ bond. The donor can be bound via a coordinate bond or not be coordinated. The donor is preferably coordinated intramolecularly to the metal center.

$E^{1B}$ to $E^{5B}$ are preferably four carbon atoms and one phosphorus atom or carbon atoms only; very particular preference is given to all $E^{1B}$ to $E^{5B}$ being carbon.

$A^{1B}$ can, for example, together with the bridge $R^B$ form an amine, ether, thioether or phosphine. Moreover, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from 1 to 4 carbon atoms and/or one sulfur or oxygen atom as ring atoms in addition to carbon atoms are 2-furyl, 2-thienyl, 2-pyrrolyl, 3-isoxazolyl, 5-isoxazolyl, 3-isothiazolyl, 5-iso-thiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl or 1,2,4-triazol-3-yl. Examples of 6-membered heteroaryl groups which can contain from 1 to 4 nitrogen atoms and/or one phosphorus atom are 2-pyridinyl, 2-phosphabenzolyl 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl or 1,2,4-triazin-6-yl. The 5-membered and 6-membered heteroaryl groups can also be substituted by $C_1$–$C_{10}$-alkyl, $C_6$–$C_{10}$-aryl, alkylaryl having from 1 to 10 carbon atoms in the alkyl part and 6–10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thianaphthenyl, 7-thianaphthenyl, 3-indazolyl, 7-indazolyl, 2-benzimidazolyl or 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quin-oxalyl, 4-acridyl, 1-phenanthridyl or 1-phenazyl. Nomenclature and numbering of the heterocycles has been taken from L. Fieser and M. Fieser, Lehrbuch der organischen Chemie, 3rd Revised Edition, Verlag Chemie, Weinheim 1957. In a preferred embodiment, $A^{1B}$ is an unsubstituted, substituted or fused, heteroaromatic ring system or $NR^{5B}R^{6B}$. Here, preference is given to simple systems which are readily available and cheap and are selected from the following group:

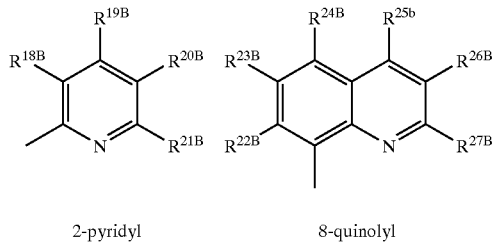

2-pyridyl    8-quinolyl

Possible substituents $R^{18B}$ to $R^{27B}$ are the same radicals as described for $R^{1B}$–$R^{16B}$ and halogens such as fluorine, chlorine or bromine, with two vicinal radicals $R^{18B}$ to $R^{27B}$ also being able to be joined to form a 5- or 6-membered ring and also being able to be substituted by halogens such as fluorine, chlorine or bromine. Preferred radicals $R^{18B}$ to $R^{27B}$ are hydrogen, methyl, ethyl, n-propyl, n-butyl, tert-butyl, n-pentyl, n-hexyl, n-heptyl, n-octyl, vinyl, allyl, benzyl, phenyl, naphthyl, biphenyl and anthranyl, and also fluorine, chlorine and bromine. Possible organosilicon substituents are, in particular, trialkylsilyl groups having from 1 to 10 carbon atoms in the alkyl radical, especially trimethylsilyl groups. Very particular preference is given to $A^{1B}$ being an unsubstituted or substituted, e.g. alkyl-substituted, quinolyl, in particular one bound in position 8, e.g. 8-quinolyl, 8-(2-methylquinolyl), 8-(2,3,4-trimethylquinolyl), 8-(2,3,4,5,6,7-hexamethylquinolyl). It is very simple to prepare and at the same time gives very good activities.

The rigid bridge $R^B$ between the cyclopentadienyl ring and the functional group $A^{1B}$ is an organic diradical comprising carbon and/or silicon units and having a chain length of from 1 to 3. $R^B$ can be bound to $A^{1B}$ via $L^1$ or via $CR^9$. Owing to the ease of preparation, preference is given to the combination of $R^B$=CH=CH or 1,2-phenylene with $A^{1B}$= $NR^{5B}R^{6B}$, and also $R^B$=$CH_2$, $C(CH_3)_2$ or $Si(CH_3)_2$ with $A^{1B}$=unsubstituted or substituted 8-quinolyl or unsubstituted or substituted 2-pyridyl. Systems without a bridge $R^B$, in which k is 0, are also very particularly simple to obtain. In this case, $A^{1B}$ is preferably unsubstituted or substituted quinolyl, in particular 8-quinolyl.

The number $n^{1B}$ of the ligands $X^{1B}$ depends on the oxidation state of the transition metal $M^{1B}$. The number $n^{1B}$ can thus not be given in general terms. The oxidation state of the transition metals $M^{1B}$ in catalytically active complexes are usually known to those skilled in the art. Chromium, molybdenum and tungsten are very probably present in the oxidation state +3. However, it is also possible to use complexes whose oxidation state does not correspond to that of the active catalyst. Such complexes can then be appropriately reduced or oxidized by means of suitable activators. Preference is given to using chromium complexes in the oxidation state +3.

The transition metal complex of the formula (II) can be in the form of a monomeric, dimeric or trimeric compound, with $m^{1B}$ then being 1, 2 or 3. It is possible, for example, for one or more ligands $X^{1B}$ to bridge two metal centers $M^{1B}$.

Preferred complexes are, for example:

1-(8-quinolyl)-2-methyl-4-methylcyclopentadienyl-chromium(III) dichloride, 1-(8-quinolyl)-3-isopropyl-5-methylcyclopentadienyl-chromium(III) dichloride, 1-(8-quinolyl)-3-tert-butyl-5-methylcyclopentadienylchromium(III) dichloride,
1-(8-quinolyl)-2,3,4,5-tetramethylcyclopentadienylchromium(III) dichloride,
1-(8-quinolyl)tetrahydroindenylchromium(III) dichloride,
1-(8-quinolyl)indenylchromium(III) dichloride,
1-(8-quinolyl)-2-methylindenylchromium(III) dichloride,
1-(8-quinolyl)-2-isopropylindenylchromium(III) dichloride,
1-(8-quinolyl)-2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride,
1-(8-(2-methylquinolyl))-2-methyl-4-methylcyclopentadienylchromium(III) dichloride,
1-(8-(2-methylquinolyl))-2,3,4,5-tetramethylcyclopentadienylchromium(III) dichloride,
1-(8-(2-methylquinolyl))tetrahydroindenylchromium(III) dichloride,
1-(8-(2-methylquinolyl))indenylchromium(III) dichloride,
1-(8-(2-methylquinolyl))-2-methylindenylchromium(III) dichloride,
1-(8-(2-methylquinolyl))-2-isopropylindenylchromium(III) dichloride,
1-(8-(2-methylquinolyl))-2-ethylindenylchromium(III) dichloride,
1-(8-(2-methylquinolyl))-2-tert-butylindenylchromium(III) dichloride,
1-(8-(2-methylquinolyl))benzindenylchromium(III) dichloride or
1-(8-(2-methylquinolyl))-2-methylbenzindenylchromium(III) dichloride.

The preparation of functional cyclopentadienyl ligands has been known for a long time. Various synthetic routes to these complexing ligands are described, for example, by M. Enders et. al. in Chem. Ber. (1996), 129, 459–463 or P. Jutzi and U. Siemeling in J. Orgmet. Chem. (1995), 500, 175–185.

The metal complexes, in particular the chromium complexes, can be obtained in a simple manner by reacting the corresponding metal salts, e.g. metal chlorides, with the ligand anion (e.g. using a method similar to the examples in DE-A-197 10615).

Further organic transition metal compounds B) which are suitable for the purposes of the present invention are imidochromium compounds of the formula (III),

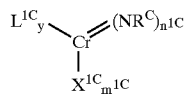
(III)

where the variables have the following meanings:
$R^C$ are $R^{1C}C=NR^{2C}$, $R^{1C}C=O$, $R^{1C}C=O(OR^{2C})$, $R^{1C}C=S$, $(R^{1C})_2P=O$, $(OR^{1C})_2P=O$, $SO_2R^{1C}$, $R^{1C}R^{2C}C=N$, $NR^{1C}R^{2C}$ or $BR^{1C}R^{2C}$, $C_1$–$C_{20}$-alkyl, $C_1$–$C_{20}$-cycloalkyl, $C_2$–$C_{20}$-alkenyl, $C_6$–$C_{20}$-aryl, alkylaryl having from 1 to 10 carbon atoms in the alkyl part and 6–20 carbon atoms in the aryl part, hydrogen if this is bound to a carbon atom, with the organic radicals $R^{1C}$ and $R^{2C}$ also being able to bear inert substituents,
$X^{1C}$ are each, independently of one another, fluorine, chlorine, bromine, iodine, $NR^{3C}R^{4C}$, $NP(R^{3C})_3$, $OR^{3C}$, $OSi(R^{3C})_3$, $SO_3R^{3C}$, $OC(O)R^{3C}$, β-diketonate, $BF_4^-$, $PF_6^-$ or a bulky weakly coordinating or noncoordinating anion,
$R^{1C}$–$R^{4C}$ are each, independently of one another, $C_1$–$C_{20}$-alkyl, $C_2$–$C_{20}$-alkenyl, $C_6$–$C_{20}$-aryl, alkylaryl having from 1 to 10 carbon atoms in the alkyl part and 6–20 carbon atoms in the aryl part, hydrogen if this is bound to a carbon atom, with the organic radicals $R^{1C}$ to $R^{4C}$ also being able to bear inert substituents,
$n^{1C}$ is 1 or 2,
$m^{1C}$ is 1, 2 or 3 and has a value, depending on the valence of Cr, for which the metallocene complex of the formula (III) is uncharged,
$L^{1C}$ is an uncharged donor and
y is from 0 to 3.

These compounds and their preparation are described, for example, in WO 01/09148.

Further suitable organic transition metal compounds B) are transition metal complexes with a tridentate macrocyclic ligand.

In particular, suitable organic transition metal compounds B) also include compounds of the formula (IV)

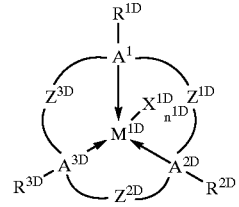
(IV)

where the variables have the following meanings:
$M^{1D}$ is a transition metal of groups 3–12 of the Periodic Table,
$Z^{1D}$–$Z^{3D}$ are each a diradical selected from the following group

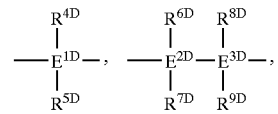

where
$E^{1D}$–$E^{3D}$ are each silicon or carbon,
$A^{1D}$–$A^{3D}$ are each nitrogen or phosphorus,
$R^{1D}$–$R^{9D}$ are each hydrogen, $C_1$–$C_{20}$-alkyl, 5- to 7-membered cycloalkyl which may in turn bear a $C_6$–$C_{10}$-aryl group as substituent, $C_2$–$C_{20}$-alkenyl, $C_6$–$C_{20}$-aryl, alkylaryl having from 1 to 10 carbon atoms in the alkyl part and 6–20 carbon atoms in the aryl part, $SiR^{10D}_3$, where the organic radicals $R^{1D}$–$R^{9D}$ may be substituted by halogen(s) and further functional groups which preferably bear elements of group 15 and/or 16 of the Periodic Table of the Elements and two geminal or vicinal radicals $R^{1D}$–$R^{9D}$ may also be joined to form a five- or six-membered ring,
$X^{1D}$ are each, independently of one another, fluorine, chlorine, bromine, iodine, hydrogen, $C_1$–$C_{10}$-alkyl, $C_2$–$C_{10}$-alkenyl, $C_6$–$C_{20}$-aryl, alkylaryl having 1–10 carbon atoms in the alkyl part and 6–20 carbon atoms in the aryl part, $NR^{10D}_2$, $OR^{10D}$, $SR^{10D}$, $SO_3R^{10D}$, $OC(O)R^{10D}$, CN, SCN, =O, β-diketonate, $BF_4^-$, $PF_6^-$ or a bulky noncoordinating anion,
$R^{10D}$ are each, independently of one another, hydrogen, $C_1$–$C_{20}$-alkyl, 5- to 7-membered cycloalkyl which may in turn bear a $C_6$–$C_{10}$ aryl group as substituent, $C_2$–$C_{20}$-alkenyl, $C_6$–$C_{20}$-aryl, alkylaryl having from 1 to 10 carbon atoms in the alkyl part and 6–20 carbon atoms in the aryl part and two radicals $R^{10D}$ may also be joined to form a five- or six-membered ring and $n^{1D}$ is a number from 1 to 4 for which the metallocene complex of the formula (IV) is uncharged.

Preferred organic transition metal compounds of the formula (IV) are:

[1,3,5-tri(methyl)-1,3,5-triazacyclohexane]chromium trichloride,

[1,3,5-tri(ethyl)-1,3,5-triazacyclohexane]chromium trichloride,

[1,3,5-tri(octyl)-1,3,5-triazacyclohexane]chromium trichloride,

[1,3,5-tri(dodecyl)-1,3,5-triazacyclohexane]chromium trichloride and

[1,3,5-tri(benzyl)-1,3,5-triazacyclohexane]chromium trichloride.

It is also possible to use mixtures of various organic transition metal compounds as component B).

The catalyst system preferably further comprises at least one cation-forming compound as component C).

Suitable cation-forming compounds C) which are capable of reacting with the organic transition metal compound B) to convert it into a cationic compound are, for example, compounds such as an aluminoxane, a strong uncharged Lewis acid, an ionic compound having a Lewis-acid cation or an ionic compound containing a Brönsted acid as cation. In the case of metallocene complexes as organic transition metal compound B), the cation-forming compounds C) are frequently also referred to as metallocene ion-forming compounds.

As aluminoxanes, it is possible to use, for example, the compounds described in WO 00/31090. Particularly useful aluminoxanes are open-chain or cyclic aluminoxane compounds of the formula (X) or (XI)

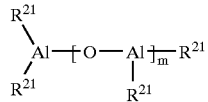

(X)

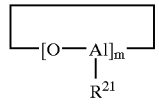

(XI)

where $R^{21}$ is a $C_1$–$C_4$-alkyl group, preferably a methyl or ethyl group, and m is an integer from 5 to 30, preferably from 10 to 25.

These oligomeric aluminoxane compounds are usually prepared by reaction of a solution of trialkylaluminum with water. In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, preferably aluminum alkyls.

Furthermore, modified aluminoxanes in which some of the hydrocarbon radicals or hydrogen atoms have been replaced by alkoxy, aryloxy, siloxy or amide radicals can also be used as component C) in place of the aluminoxane compounds of the formula (X) or (XI).

It has been found to be advantageous to use the organic transition metal compound B) and the aluminoxane compounds in such amounts that the atomic ratio of aluminum from the aluminoxane compounds to the transition metal from the organic transition metal compound B) is in the range from 10:1 to 1000:1, preferably from 20:1 to 500:1 and in particular in the range from 30:1 to 400:1.

As strong, uncharged Lewis acids, preference is given to compounds of the formula (XII)

$$M^2X^1X^2X^3 \quad\quad (XII)$$

where $M^2$ is an element of group 13 of the Periodic Table of the Elements, in particular B, Al or Ga, preferably B, $X^1$, $X^2$ and $X^3$ are each hydrogen, $C_1$–$C_{10}$-alkyl, $C_6$–$C_{15}$-aryl, alkylaryl, arylalkyl, haloalky or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Further examples of strong, uncharged Lewis acids are given in WO 00/31090.

Particular preference is given to compounds of the formula (XII) in which $X^1$, $X^2$ and $X^3$ are identical, preferably tris(pentafluorophenyl)borane.

Strong uncharged Lewis acids suitable as cation-forming compounds C) also include the reaction products of a boronic acid with two equivalents of an aluminum trialkyl or the reaction products of an aluminum trialkyl with two equivalents of an acidic fluorinated, in particular perfluorinated, carbon compound such as pentafluorophenol or bis(pentafluorophenyl)borinic acid.

The suitable ionic compounds having Lewis-acid cations include salt-like compounds of the cation of the formula (XIII)

$$[(Y^{a+})Q_1Q_2\ldots Q_z]^{d+} \quad\quad (XIII)$$

where

Y is an element of groups 1 to 16 of the Periodic Table of the Elements, $Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6 and z is an integer from 0 to 5, d corresponds to the difference a–z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis (pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound with the boron or aluminum compound, e.g. triphenylchloromethane. In addition, a fourth compound which likewise reacts with the boron or aluminum compound, e.g. pentafluorophenol, can be added.

Ionic compounds containing Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Preferred ionic compounds C) are N,N-dimethylanilinium tetrakis(pentafluorophenyl)borate and, in particular, N,N-dimethylcyclohexylammonium tetrakis(pentafluorophenyl)borate and N,N-dimethylbenzylammonium tetrakis(pentafluorophenyl)borate.

It is also possible for two or more borate anions to be joined to one another, as in the dianion [(C$_6$F$_5$)$_2$B—C$_6$F$_4$—B(C$_6$F$_5$)$_2$]$^{2-}$, or the borate anion can be bound via a group on the support surface.

Further suitable cation-forming compounds C) are listed in WO 00/31090.

The amount of strong, uncharged Lewis acids, ionic compounds having Lewis-acid cations or ionic compounds containing Brönsted acids as cations is preferably from 0.1 to 20 equivalents, preferably from 1 to 10 equivalents, based on the organic transition metal compound B).

Suitable cation-forming compounds C) also include boron-aluminum compounds such as di[bis-(pentafluorophenyl)boroxy]methylalane. Examples of such boron-aluminum compounds are those disclosed in WO 99/06414.

It is also possible to use mixtures of all the abovementioned cation-forming compounds C). Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane.

Both the organic transition metal compound B) and the cation-forming compounds C) are preferably used in a solvent, preferably an aromatic hydrocarbon having from 6 to 20 carbon atoms, in particular xylenes or toluene.

The catalyst system comprises at least one organic magnesium compound as additional component D). Organic magnesium compounds D) contain magnesium in the oxidation state 2 which bears at least one ligand from the group consisting of hydrocarbons, alkoxides and aryloxides, amides, carboxylates and acetylacetonates. Preferred organic magnesium compounds D) bear at least one $C_1$–$C_{20}$-hydrocarbon radical as ligand. These are, for example, organic magnesium compounds of the formula (XIV),

where
$R^{1E}$ is hydrogen, $C_1$–$C_{20}$-alkyl, $C_6$–$C_{20}$-aryl, alkylaryl or arylalkyl each having from 1 to 10 carbon atoms in the alkyl part and from 6 to 19 carbon atoms in the aryl part, SiR$^{3E}_3$ $R^{2E}$ is hydrogen, fluorine, chlorine, bromine, iodine, $C_1$–$C_{20}$-alkyl, $C_6$–$C_{20}$-aryl, alkylaryl, arylalkyl or alkoxy each having from 1 to 10 carbon atoms in the alkyl part and from 6 to 19 carbon atoms in the aryl part, $R^{3E}$ is $C_1$–$C_{20}$-alkyl, $C_6$–$C_{20}$-aryl, alkylaryl or arylalkyl each having from 1 to 10 carbon atoms in the alkyl part and from 6 to 19 carbon atoms in the aryl part and r is 1 or 2.

Suitable carboorganic radicals $R^{1E}$ and $R^{2E}$ are, for example, the following: $C_1$–$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn be a $C_6$–$C_{10}$-aryl group as substituent, e.g. cyclopropane, cyclobutane, cyclopentane, cyclohexane, cycloheptane, cyclooctane, cyclononane or cyclododecane, $C_2$–$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$–$C_{20}$-aryl which may bear further alkyl groups as substituents, e.g. phenyl, naphthyl, biphenyl, anthranyl, o-, m-, p-methylphenyl, 2,3-, 2,4-, 2,5-, or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where $R^{1E}$ and $R^{2E}$ may also be joined to form a 5- or 6-membered ring and the organic radicals $R^{1E}$ and $R^{2E}$ may also be substituted by halogens such as fluorine, chlorine or bromine. Preferred radicals $R^{1E}$ and $R^{2E}$ are methyl, ethyl, n-propyl, isopropyl, n-butyl, isobutyl, tert-butyl, n-pentyl, n-hexyl, n-heptyl, n-octyl, vinyl, allyl, benzyl, phenyl or naphthyl. $R^{3E}$ radicals in organosilicon radicals SiR$^{3E}_3$ may be those as described in more detail above for $R^{1E}$ and $R^{2E}$, with two $R^{3E}$ also being able to be joined to form a 5- or 6-membered ring. Examples of suitable organosilicon radicals are trimethylsilyl, triethylsilyl, butyldimethylsilyl, tributylsilyl, triallylsilyl, triphenylsilyl or dimethylphenylsilyl.

Particularly useful organic magnesium compounds are methylmagnesium chloride, methyl-magnesium bromide, ethylmagnesium chloride, ethylmagnesium bromide, n-butylmagnesium chloride, dimethylmagnesium, diethylmagnesium, di-n-butylmagnesium, n-butyl-n-octylmagnesium and n-butyl-n-heptylmagnesium, in particular n-butyl-n-octylmagnesium.

It is possible to use one or more organic magnesium compounds D). Preference is given to using one organic magnesium compound D). The organic magnesium compound D) is present in the catalyst system in such an amount that the molar ratio of Mg to transition metal from organic transition metal compound B) is from 2000:1 to 0.1:1, preferably from 800:4 to 0.2:1 and particularly preferably from 100:1 to 1:1.

The catalyst system can further comprise, as additional component E), a metal compound of the formula (XV),

where
$M^F$ is Li, Na, K, Be, Ca, Sr, Ba, boron, aluminum, gallium, indium or thallium,
$R^{1F}$ is hydrogen, $C_1$–$C_{10}$-alkyl, $C_6$–$C_{15}$-aryl, alkylaryl or arylalkyl each having from 1 to 10 carbon atoms in the alkyl part and from 6 to 20 carbon atoms in the aryl part,
$R^{2F}$ and $R^{3F}$ are each hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical,
$r^F$ is an integer from 1 to 3,
and
$s^F$ and $t^F$ are integers from 0 to 2, with the sum $r^F+s^F+t^F$ corresponding to the valence of $M^F$,
where the component E) is not identical to the component C). It is also possible to use mixtures of various metal compounds of the formula (XV).

Among the metal compounds of the formula (XV), preference is given to those in which
$M^F$ is lithium or aluminum and
$R^{2F}$ and $R^{3F}$ are each $C_1$–$C_{10}$-alkyl.

Particularly preferred metal compounds of the formula (XV) are n-butyllithium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

When a metal compound E) is used, it is preferably present in the catalyst system in such an amount that the molar ratio of $M^F$ from formula (XV) to transition metal from organic transition metal compound B) is from 2000:1 to 0.1:1, preferably from 800:1 to 0.2:1 and particularly preferably from 100:1 to 1:1.

The catalyst system of the present invention is in principle prepared by immobilizing at least one of the components B) or C) on the support by physisorption or by means of chemical reaction, i.e. covalent binding of the components, with reactive groups of the support surface. The order in which the support component, the component B) and any component C) are combined is immaterial. The components B) and C) can be added independently of one another or simultaneously. After the individual process steps, the solid can be washed with suitable inert solvents such as aliphatic or aromatic hydrocarbons.

In a preferred embodiment, the organic transition metal compound B) is brought into contact with the cation-forming compound C) in a suitable solvent, usually giving a soluble reaction product, an adduct or a mixture. The preparation obtained in this way is then brought into contact with the calcined hydrotalcite A), which may have been pretreated, and the solvent is completely or partly removed. This preferably gives a solid in the form of a free-flowing powder. Examples of the industrial implementation of the above process are described in WO 96/00243, WO 98/40419 or WO 00/05277. A further preferred embodiment comprises firstly applying the cation-forming compound C) to the calcined hydrotalcite A) and subsequently bringing this supported cation-forming compound into contact with the organic transition metal compound B).

The organic magnesium compound D) can likewise be reacted in any order with the components A), B) and optionally C) and E). Preference is given to firstly bringing D) into contact with component A) and then proceeding as described above with the components B) and C). In another preferred embodiment, a catalyst solid is prepared from the components A), B) and C) as described above and this is brought into contact with the component D) during, at the beginning of or shortly before the polymerization. Preference is given to firstly bringing D) into contact with the alpha-olefin to be polymerized and subsequently adding the catalyst solid derived from the components A), B) and C) as described above. The component E) is optional. Preference is given to not using any further component E). If a component E) is used, the same preferred embodiments for bringing component D) into contact with A), B) and C) apply.

It is also possible for the catalyst system firstly to be prepolymerized with α-olefins, preferably linear $C_2$–$C_{10}$-1-alkenes and in particular ethylene or propylene, and the resulting prepolymerized catalyst solid then to be used in the actual polymerization. The mass ratio of catalyst solid used in the prepolymerization to monomer polymerized onto it is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the supported catalyst system. The molar ratio of additives to transition metal compound B) is usually from 1:1000 to 1000:1, preferably from 1:5 to 20:1.

The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes or gas-phase fluidized-bed processes are all possible.

The polymerizations can generally be carried out at from −60 to 350° C. under pressures in the range from 0.5 to 4000 bar and at mean residence times of from 0.5 to 5 hours, preferably from 0.5 to 3 hours. The advantageous pressure and temperature ranges for carrying out the polymerizations depend greatly on the polymerization method. In the case of high-pressure polymerization processes, which are usually carried out at pressures of from 1000 to 4000 bar, in particular from 2000 to 3500 bar, high polymerization temperatures are generally also set. Advantageous temperature ranges for these high-pressure polymerization processes are from 200 to 280° C., in particular from 220 to 270° C. In the case of low-pressure polymerization processes, it is usual to set a temperature which is at least a few degrees below the softening temperature of the polymer. In particular, temperatures of from 50 to 180° C., preferably from 70 to 120° C., are set in these polymerization processes. In the case of suspension polymerizations, the polymerization is usually carried out in a suspension medium, preferably in an inert hydrocarbon such as isobutane or else in the monomers themselves. The polymerization temperatures are generally in the range from −20 to 115° C., and the pressure is generally in the range from 1 to 100 bar. The solids content of the suspension is generally in the range from 10 to 80%. The process can be carried out batchwise, e.g. in stirring autoclaves, or continuously, e.g. in tube reactors, preferably in loop reactors. In particular, the Phillips PF process as described in U.S. Pat. No. 3,242,150 and U.S. Pat. No. 3,248,179 can be employed.

Among the polymerization methods mentioned, particular preference is given to gas-phase polymerization, in particular in gas-phase fluidized-bed reactors, to solution polymerization and to suspension polymerization, in particular in loop reactors and stirred tank reactors. The gas-phase polymerization can also be carried out in the condensed or supercondensed mode, in which part of the circulating gas is cooled to below the dew point and fed into the reactor as a two-phase mixture. Different or identical polymerization processes can also, if desired, be connected in series so as to form a polymerization cascade. Furthermore, molar mass regulators, for example hydrogen, or customary additives such as antistatics can also be used in the polymerizations.

The catalyst systems of the present invention give a very high productivity in the polymerization of olefins, offer advantages in the work-up of the polymers after the polymerization and lead to significantly fewer problems in respect of catalyst residues in the polymer. The polymers prepared using the catalyst system of the present invention are particularly useful for applications which require a high product purity. The catalyst systems of the present invention also show excellent activity at relatively low molar ratios of aluminoxane to organic transition metal compound.

EXAMPLES

To Characterize the Samples, the Following Tests were Carried Out:

Determination of the magnesium and aluminum contents:
The magnesium and aluminum contents were determined on the samples digested in a mixture of concentrated nitric acid, phosphoric acid and sulfuric acid using an inductively coupled plasma atom emission spectrometer (ICP-AES) from Spectro, Kleve, Germany, with the measurements being carried out using the spectral lines at 277.982 nm for magnesium and at 309.271 nm for aluminum.

Determination of the specific surface area:
By nitrogen adsorption in accordance with DIN 66131

Determination of the pore volume:
By mercury porosymmetry in accordance with DIN 66133

Determination of $d_{10}$, $d_{50}$ and $d_{90}$:
The particle size distribution of the particles was measured in a dispersion in isopropanol by laser light scattering using a Mastersizer X from Malvern, Great Britain The parameters $d_{10}$, $d_{50}$ and $d_{90}$ are the volume-based percentiles of the diameter. $d_{50}$ is at the same time the median of the particle size distribution.

Determination of the loss on ignition:
The loss on ignition is the weight loss experienced by a sample which is heated in two steps, firstly for 30 minutes at 200° C. in a drying oven and then for 1 hour at 950° C. in a muffle furnace.

X-ray diffractometry:
The X-ray diffraction patterns were measured by means of a powder diffractometer D 5000 from Siemens using Cu—$K_\alpha$ radiation.

Determination of the OH number:
About 20 g of the solid to be examined are suspended in 250 ml of heptane and the suspension is cooled to 0° C. while stirring. At constant temperature, 40 ml of a 2 M solution of triethylaluminum in heptane are added continuously over a period of 30 minutes. The ethane formed is collected and its volume is determined. The OH number is the molar amount of ethane formed divided by the mass of support used.

Determination of the residual moisture content:
The residual moisture content is the content of volatiles given by a measurement under an inert gas atmosphere using a Mettler LJ 16 Moisture Analyser from Mettler-Toledo, Greifensee, Switzerland.

Determination of the eta value:
using an automatic Ubbelohde viscometer (Lauda PVS 1) with decalin as solvent at 130° C. (ISO1628 at 130° C., 0.001 g/ml of decalin)

BRIEF DESCRIPTION OF THE DRAWINGS

The conventional uncalcined magnesium-aluminum mixed oxide support material used was Puralox MG 61 from Condea Chemie GmbH. This is magnesium-aluminum mixed oxide which has an MgO content of 61% by weight, a specific surface area of 156 m²/g, a pore volume of 1.4 ml/g and a particle size distribution characterized by a $d_{10}/d_{50}/d_{90}$ ratio of 21.1/44.0/71.0 mm and has been calcined at 550° C. for 3 hours in a rotary tube furnace. A loss on ignition of 11.6% by weight was determined on the starting material. FIG. 1 shows an X-ray diffraction pattern of this magnesium-aluminum mixed oxide.

The starting mixed oxide used above was calcined for 3 hours but at only 250° C. FIG. 2 shows the X-ray diffraction pattern of this partially calcined magnesium-aluminum mixed oxide.

The starting mixed oxide used above was calcined for 3 hours but at 800° C. FIG. 3 shows the X-ray diffraction pattern of this partially calcined magnesium-aluminum mixed oxide. It had a specific surface area of 138 m²/g, a pore volume of 1.59 ml/g and a loss on ignition of 3.74% by weight.

Figure 1:
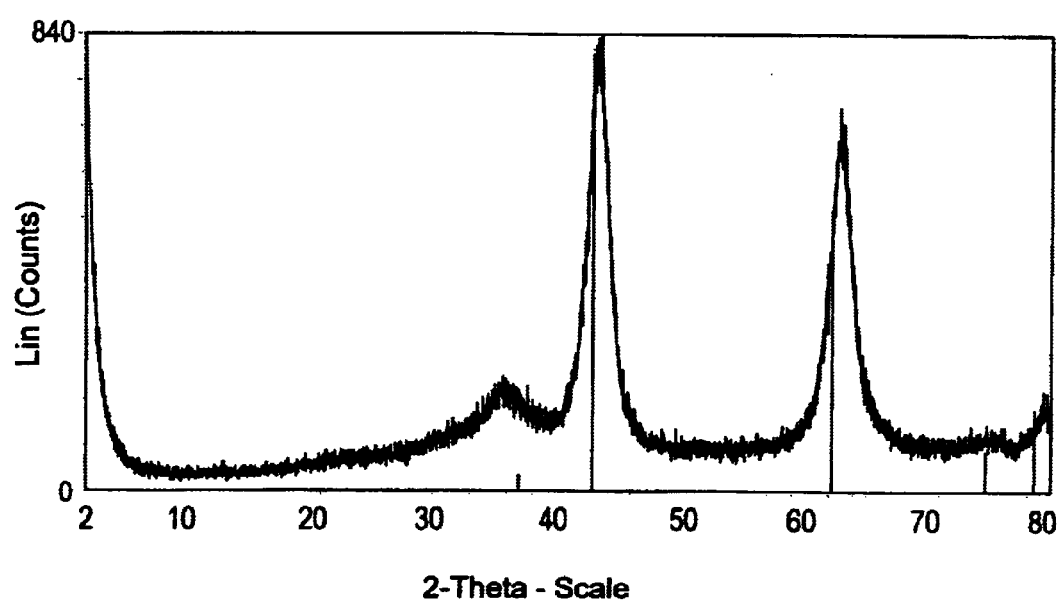
FIG. 1 shows an X-ray diffraction pattern of a conventional uncalcined magnesium-aluminum mixed oxide (prior art)
Figure 2:
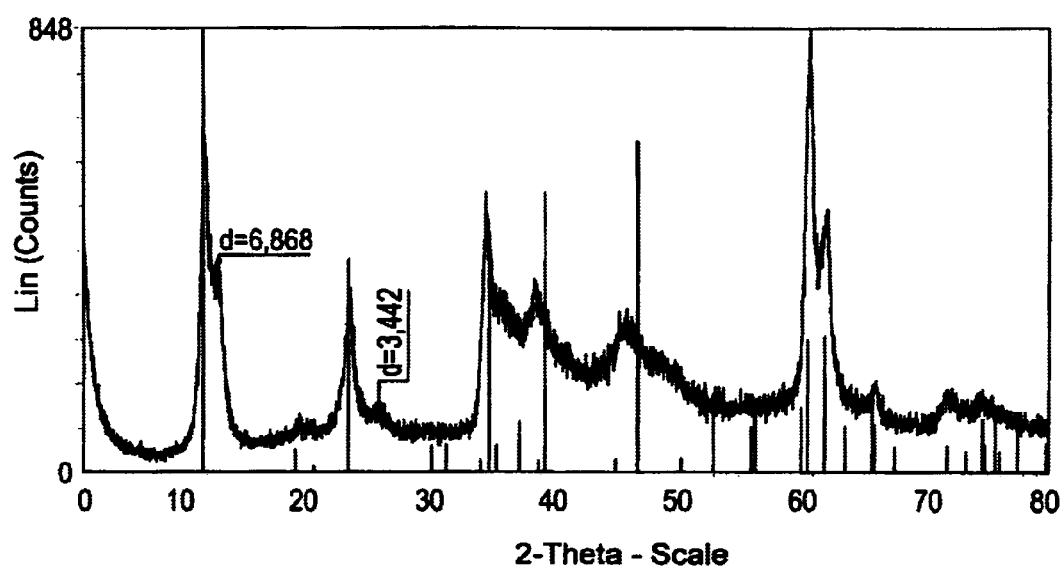
FIG. 2 shows an X-ray diffraction pattern of a conventional magnesium-aluminum mixed oxide after calcining for 3 hours at 250° C. (invention)
Figure 3:
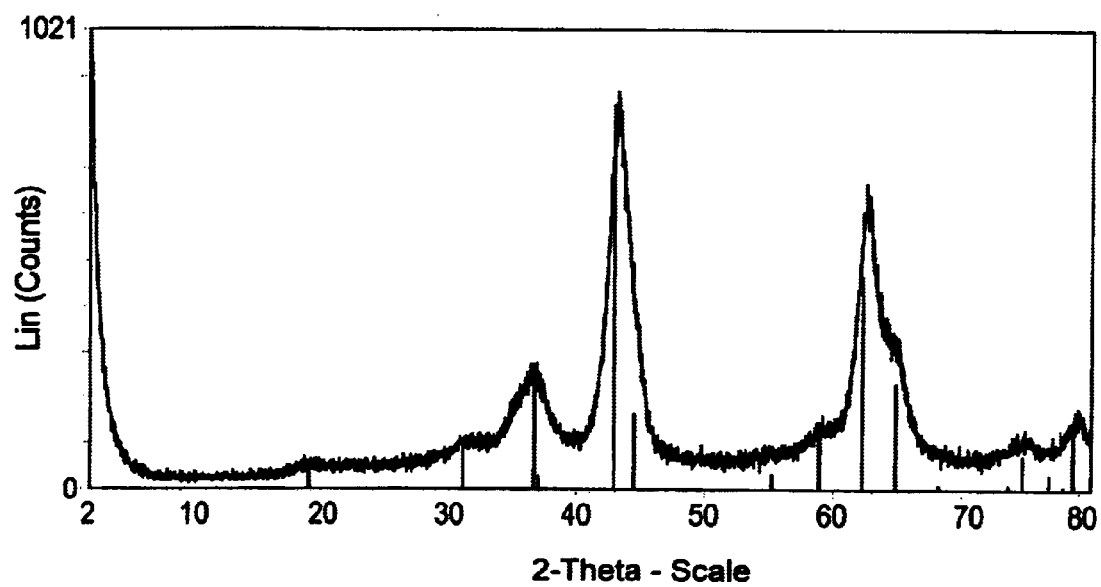
FIG. 3 shows an X-ray diffraction pattern of a conventional magnesium-aluminum mixed oxide after calcining for 3 hours at 800° C. (invention)
Figure 4:
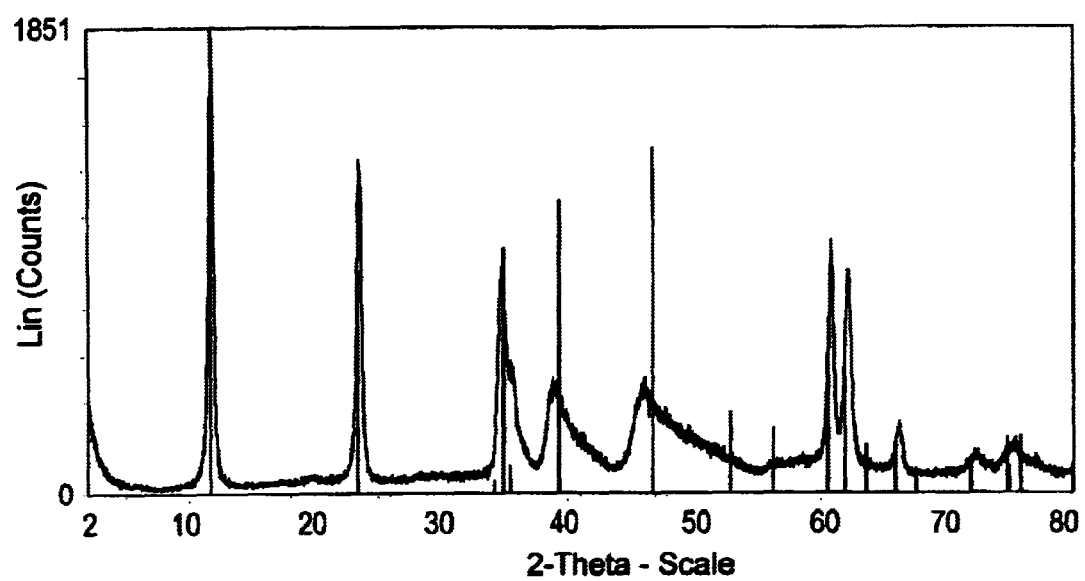
FIG. 4 shows an X-ray diffraction pattern of a conventional uncalcined magnesium-aluminum hydroxide (prior art)

An X-ray diffraction pattern of an uncalcined starting material (cf. Comparative Example 3) having a specific surface area of 236 m²/g, a pore volume of 1.12 ml/g and a loss on ignition of 45.6% by weight is shown in FIG. 4.

Example 1 a) Pretreatment of the Support
100 g of Puralox MG 61 were firstly dried for 30 hours at 180° C. and 1 mbar and subsequently stored in a nitrogen atmosphere. This reduced the loss on ignition to 7.1% by weight.

Example 1 a) Pretreatment of the Support
100 g of Puralox MG 61 from Condea Chemie GmbH were heated at 150° C. for 6 hours. The support subsequently had an OH number of 0.19 mmol/g of support.

b) Loading with Metallocene/MAO
287.1 mg of (nBu-Cp)$_2$ZrCl$_2$ (Witco, Eurecen 5031) were suspended in 4.1 ml of toluene, admixed with 18.6 ml of a 4.75 M solution of MAO in toluene from Albemarle and stirred for 45 minutes. The metallocene/MAO solution was added over a period of 10 minutes to 14.2 g of the deactivated support from Example 1a) and the mixture was stirred for another 60 minutes. The catalyst was then dried at room temperature and $10^{-3}$ mbar. This gave 20.2 g of a pale yellow-beige solid.

Example 2

Polymerization
400 ml of isobutane and 3 ml of a 20% strength by weight solution of butyloctylmagnesium in heptane (corresponding to 150 mg of butyloctylmagnesium) were placed in a 1 l autoclave which had been made inert by means of argon, and 24.0 mg of the catalyst solid obtained in Example 1b) were then introduced. Polymerization was carried out at 70° C. under an ethylene pressure of 40 bar for 90 minutes. The polymerization was stopped by releasing the pressure and the product was discharged via the bottom valve. This gave 400 g of polyethylene having an eta value of 3.68 dl/g.

Productivity: 16,670 g of PE/g of catalyst solid

Comparative Example C1

Polymerization
400 ml of isobutane and 3 ml of a butyllithium solution in heptane (corresponding to 30 mg of butyllithium) were placed in a 1 l autoclave which had been made inert by means of argon, and 22.8 mg of the catalyst solid obtained in Example 1b) were then introduced. Polymerization was carried out at 70° C. under an ethylene pressure of 40 bar for 90 minutes. The polymerization was stopped by releasing the pressure and the product was discharged via the bottom valve. This gave 200 g of polyethylene having an eta value of 3.95 dl/g.

Productivity: 8800 g of PE/g of catalyst solid

Example 3

Polymerization 1.5 ml of a 20% strength by weight butyloctylmagnesium solution in heptane (corresponding to 75 mg of butyloctylmagnesium), 1 ml of a Costelan AS 100 solution (antistatic) and 8 ml of heptane were introduced into a 1 l autoclave which had been charged with an initial charge of 100 g of polyethylene and made inert by means of argon, and 42.0 mg of the catalyst solid obtained in Example 1b) were then introduced. Polymerization was carried out at 70° C. under an ethylene pressure of 10 bar (20 bar total pressure) for 90 minutes. The polymerization was stopped by releasing the pressure and the product was discharged via the bottom valve. This gave 95 g of polyethylene having an eta value of 2.44 dl/g.

Productivity: 2200 g of PE/g of catalyst solid

Comparative Example C2

Polymerization 2 ml of a triisoprenylaluminum solution in heptane (corresponding to 75 mg of triisoprenyl-aluminum), 1 ml of a Costelan AS 100 solution and 8 ml of heptane were introduced into a 1 l autoclave which had been charged with an initial charge of 100 g of polyethylene and made inert by means of argon, and 40.0 mg of the catalyst solid obtained in Example 1b) were then introduced. Polymerization was carried out at 70° C. under an ethylene pressure of 10 bar (20 bar total pressure) for 90 minutes. The polymerization was stopped by releasing the pressure and the product was discharged via the bottom valve.

Productivity: less than 100 g of PE/g of catalyst solid

Comparative Example C3 a) Pretreatment of the Support

The procedure of Example 1 was repeated, except that uncalcined magnesium-aluminum hydroxide was used. This had a specific surface area of 236 m$^2$/g and a pore volume of 1.12 ml/g. The loss on ignition was 45.6% by weight. FIG. 4 shows an X-ray diffraction pattern of this material.

b) Loading with Metallocene/MAO 276.9 mg of (nBu-Cp)$_2$ZrCl$_2$ (from Witco, Eurecen 5031) were suspended in 4 ml of toluene, admixed with 17.9 ml of a 4.75 M solution of MAO in toluene from Albemarle and the mixture was stirred for 45 minutes. The metallocene/MAO solution was added to 13.7 g of the deactivated support from Example C3a) over a period of 10 minutes and the mixture was stirred for a further 60 minutes. The catalyst was then dried at 10$^{-3}$ mbar at room temperature. This gave 18.8 g of a pale yellow-beige solid.

Comparative Example C4

Polymerization 5000 ml of isobutane and 2 ml of a 20% strength by weight butyloctylmagnesium solution in heptane (corresponding to 100 mg of butyloctylmagnesium) were placed in a 10 l autoclave which had been made inert by means of argon, and 330 mg of the catalyst solid obtained in Example C3b) were then metered in. Polymerization was carried out at 70° C. under an ethylene pressure of 40 bar for 90 minutes. The polymerization was stopped by releasing the pressure and the product was discharged via the bottom valve. This gave 950 g of polyethylene having an eta value of 3.58 dl/g.

Productivity: 2880 g of PE/g of catalyst solid

Comparative Example C5

Polymerization 1.5 ml of a 20% strength by weight butyloctylmagnesium solution in heptane (corresponding to 75 mg of butyloctylmagnesium), 1 ml of a Costelan AS 100 solution ([lacuna] % strength by weight solution) and 8 ml of heptane were introduced into a 1 l autoclave which had been charged with an initial charge of 100 g of polyethylene and made inert by means of argon, and 76.0 mg of the catalyst solid obtained in Example C3b) were then introduced. Polymerization was carried out at 70° C. under an ethylene pressure of 10 bar (20 bar total pressure) for 90 minutes. The polymerization was stopped by releasing the pressure and the product was discharged via the bottom valve. This gave 51 g of polyethylene.

Productivity: 6709 of PE/g of catalyst solid

Comparative Example C6 a) Pretreatment of the Support 100 g of ES 70x, a spray-dried silica gel from Crosfield, were heated at 600° C. for 6 hours. The support subsequently had an OH number of 0.15 mmol/g of support.

b) Loading with Metallocene/MAO 258.8 mg of (nBu-Cp)$_2$ZrCl$_2$ (from Witco, Eurecen 5031) were suspended in 0.6 ml of toluene, admixed with 16.7 ml of a 4.75 M solution of MAO in toluene from Albemarle and the mixture was stirred for 45 minutes. The metallocene/MAO solution was added to 12.8 g of the deactivated support material prepared in Comparative Example C6a), which had approximately the same OH number as the support used in Example 1b), over a period of 10 minutes and the mixture was stirred for a further 60 minutes. The catalyst was then dried at 10–3 mbar at room temperature. This gave 18.0 g of a pale yellow-beige solid.

Comparative Example C7

Polymerization

Example 2 was repeated, except that 24.8 mg of the catalyst solid prepared in Comparative Example C6b) were used. This gave 300 g of polyethylene having an eta value of 3.55 dl/g.

Productivity: 12,100 g of PE/g of catalyst solid

Comparative Example C8

Polymerization

Comparative Example C1 was repeated, except that 32 mg of the catalyst solid prepared in Comparative Example C6b) were used. This gave 260 g of polyethylene having an eta value of 3.65 dl/g.

Productivity: 8100 g of PE/g of catalyst solid

Comparative Example C9

Loading with Metallocene/MAO 234.5 mg of (nBu-Cp)$_2$ZrCl$_2$ (from Witco, Eurecen 5031) were suspended in 70 ml of toluene, admixed with 15.1 ml of a 4.75 M solution of MAO in toluene from Albemarle and the mixture was stirred for 45 minutes. The metallocene/MAO solution was added to 11.6 g of the deactivated support material prepared in Comparative Example C6a), which had approximately the same OH number as the support used in Example 4b), over a period of 10 minutes and the mixture was stirred for a further 60 minutes. The catalyst was then dried at 10–3 mbar at room temperature. This gave 18.0 g of a pale yellow-beige solid.

Comparative Example C10

Polymerization

Example 3 was repeated, except that 87 mg of the catalyst solid prepared in Comparative Example C9 were used. This gave 88 g of polyethylene.

Productivity: 1010 g of PE/g of catalyst solid

Comparative Example 11

Polymerization

Comparative Example C2 was repeated, except that 70.0 mg of the catalyst solid prepared in Comparative Example C9 were used. This gave 79 g of polyethylene.

Productivity: 1100 g of PE/g of catalyst solid

Example 4 a) Pretreatment of the Support 5 g of Puralox MG61 were dried at 180° C. at 1 mbar for 8 hours and subsequently stored under a nitrogen atmosphere.

b) Loading with Metallocene/MAO 130.3 mg of dichloro[1-(8-quinolyl)-2,3,4,5-tetramethylcyclopentadienyl]chromium (0.350 mmol) were dissolved in 9.2 ml of a 4.75 M solution of MAO in toluene from Albemarle (corresponding to 43.75 mmol of Al) and stirred at room temperature for 15 minutes (Cr:Al=1:125).

This solution was applied while stirring directly to the calcined hydrotalcite which had been pretreated in Example 4a) and the mixture was stirred for an hour once addition was completed. The reaction mixture obtained in this way was allowed to stand for 2 hours and subsequently dried at room temperature under reduced pressure. This gave a light-violet powder.

Example 5

Polymerization 5000 ml of isobutane and 2.6 ml of a 20% strength by weight butyloctylmagnesium solution in heptane (corresponding to 130 mg of butyloctylmagnesium) were placed in a 10 l autoclave which had been made inert by means of argon, and 554 mg of the catalyst solid obtained in Example 4b) were then introduced. Polymerization was carried out at 70° C. under an ethylene pressure of 40 bar for 90 minutes. The polymerization was stopped by releasing the pressure and the product was discharged via the bottom valve. This gave 1600 g of polyethylene having an eta value of 14.36 dl/g.

Productivity: 2900 g of PE/g of catalyst solid

Comparative Example C12

Polymerization 5000 ml of isobutane and 80 mg of butyllithium (as a 0.1 M solution in heptane) were placed in a 10 l autoclave which had been made inert by means of argon, and 342 mg of the catalyst solid obtained in Example 4b) were then introduced. Polymerization was carried out at 70° C. under an ethylene pressure of 40 bar for 60 minutes. The polymerization was stopped by releasing the pressure, the product was discharged via the bottom valve and admixed with methanolic HCl solution (15 ml of concentrated hydrochloric acid in 50 ml of methanol). 250 ml of methanol were subsequently added, the white polymer formed was filtered off, washed with methanol and dried at 70° C. This gave 400 g of polyethylene having an eta value of 15.57 dl/g.

Productivity: 1200 g of PE/g of catalyst solid

Example 6

Loading with Metallocene/MAO 84.6 mg of dichloro[1-(8-quinolyl)indenyl]chromium (0.231 mmol) were dissolved in 5 ml of a 4.75 M solution of MAO in toluene from Albemarle and 0.3 ml of toluene and stirred at room temperature for 15 minutes (Cr:Al=1:100).

This solution was applied while stirring directly to 3.3 g of the calcined hydrotalcite which had been pretreated in Example 4a) and the mixture was stirred for an hour once addition was completed. The reaction mixture obtained in this way was dried at room temperature under reduced pressure. This gave 5 g of a green powder.

Example 7

Polymerization

Example 5 was repeated, except that 906 mg of the catalyst solid prepared in Example 6 were used and polymerization was carried out for only 60 minutes. This gave 1650 g of polyethylene having an eta value of 16.6 dl/g.

Productivity: 1800 g of PE/g of catalyst solid

Comparative Example C13

Polymerization

Comparative Example 12 was repeated, except that 965 mg of the catalyst solid prepared in Example 6 were used. This gave 1050 g of polyethylene having an eta value of 46.93 dl/g.

Productivity: 1100 g of PE/g of catalyst solid

Example 8

Loading with Metallocene/MAO 340.3 mg of [1,3,5-tris-1-(2-phenylethyl)-1,3,5-triazacyclohexane]chromium trichloride (0.61 mmol) were dissolved in 16.05 ml of a 4.75 M solution of MAO in toluene from Albemarle (corresponding to 76.25 mmol of Al) and stirred at room temperature for 15 minutes (Cr:Al=1:125).

This solution was applied while stirring directly to 6.1 g of the calcined hydrotalcite which had been pretreated in Example 4a) and the mixture was stirred for an hour once addition was completed. The reaction mixture obtained in this way was dried at room temperature under reduced pressure. This gave 10.5 g of a light-green powder.

Example 9

Polymerization

Example 5 was repeated, except that 117 mg of the catalyst solid prepared in Example 8 were used and polymerization was carried out for only 60 minutes. This gave 76 g of polyethylene having an eta value of 1.39 dl/g.

Productivity: 650 g of pe/g of catalyst solid

We claim:

1. A catalyst system for olefin polymerization comprising

A) at least one calcined hydrotalcite,

B) at least one organic transition metal compound,

C) optionally one or more cation-forming compounds and

D) at least one organic magnesium compound.

2. A catalyst system as claimed in claim 1, wherein the calcined hydrotalcite is an aluminum-magnesium mixed oxide.

3. A catalyst system as claimed in claim 1, wherein the organic magnesium compound D) contains at least one $C_1$–$C_{20}$ hydrocarbon radical.

4. A catalyst system as claimed in claim 2, wherein the cation-forming compound C) is an open-chain or cyclic aluminoxane compound of the formula (X) or (XI)

(X)

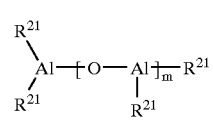

-continued

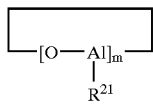
(XI)

where
R$^{21}$ is a C$_1$–C$_4$-alkyl group and m is an integer from 5 to 30.

5. A catalyst system as claimed in claim 1 which further comprises, as additional component E), one or more compounds of the formula (XV)

$$M^F(R^{1F})_{r^F}(R^{2F})_{s^F}(R^{3F})_{t^F} \quad (XV)$$

where
MF is Li, Na, K, Be, Ca, Sr, Ba, boron, aluminum, gallium, indium or thallium,
R$^{1F}$ is hydrogen, C$_1$–C$_{10}$-alkyl, C$_6$–C$_{15}$-aryl, alkylaryl or arylalkyl each having from 1 to 10 carbon atoms in the alkyl part and from 6 to 20 carbon atoms in the aryl part,
R$^{2F}$ and R$^{3F}$ are each hydrogen, halogen, C$_1$–C$_{10}$-alkyl, C$_6$–C$_{15}$-aryl, alkylaryl, arylalkyl or alkoxy each having from 1 to 10 carbon atoms in the alkyl radical and from 6 to 20 carbon atoms in the aryl radical,
r$^F$ is an integer from 1 to 3, and
s$^F$ and t$^F$ are integers from 0 to 2, with the sum r$^F$+s$^F$+t$^F$ corresponding to the valence of M$^F$.

6. A prepolymerized catalyst system comprising a catalyst system as claimed in claim 1 and linear C$_2$–C$_{10}$-1-alkenes polymerized onto it in a mass ratio of from 1:0.1 to 1:200.

7. A process for preparing polyolefins by polymerization or copolymerization of olefins in the presence of a catalyst system as claimed in claim 1.

8. A process as claimed in claim 7, wherein the monomer used in the polymerization is ethylene or a monomer mixture of ethylene and/or C$_3$–C$_{12}$-1-alkenes containing at least 50 mol % of ethylene.

* * * * *